United States Patent
Ahsan Ishtiaque et al.

(10) Patent No.: US 12,192,220 B1
(45) Date of Patent: Jan. 7, 2025

(54) ANOMALY AND CAUSALITY DETECTION

(71) Applicant: Amazon Technologies, Inc., Seattle, WA (US)

(72) Inventors: Syed Ahsan Ishtiaque, Renton, WA (US); Ketan Vijayvargiya, Redmond, WA (US); Mohammed Talal Yassar Azam, Snoqualmie, WA (US); Jill Blue Lin, Berkeley, CA (US); Mohammed Saad Ather, Sammamish, WA (US); Ankur Mehrotra, Seattle, WA (US); Peter Goetz, Leinfelden-Echterdingen (DE); Lenon Alexander Minorics, Stuttgart (DE); Patrick Bloebaum, Mountain View, CA (US); Dominik Janzing, Rottenburg (DE); David Kernert, Stuttgart (DE); Sadanand Murthy Sachidananda, Bothell, WA (US); Shashank Srivastava, Jersey City, NJ (US); Laurent Callot, Seattle, WA (US); Ali Caner Turkmen, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 312 days.

(21) Appl. No.: 17/851,429

(22) Filed: Jun. 28, 2022

(51) Int. Cl.
*H04L 9/40* (2022.01)

(52) U.S. Cl.
CPC .................. *H04L 63/1425* (2013.01)

(58) Field of Classification Search
CPC .................................... H04L 63/1425
USPC ............................................. 726/3
See application file for complete search history.

(56) References Cited

U.S. PATENT DOCUMENTS

| | | | |
|---|---|---|---|
| 11,593,669 B1* | 2/2023 | Chhabra | G06F 11/301 |
| 2017/0124263 A1* | 5/2017 | Crafts, Jr. | G16H 70/20 |
| 2019/0370610 A1* | 12/2019 | Batoukov | G06F 11/0709 |
| 2020/0371857 A1* | 11/2020 | Guha | G06N 20/00 |
| 2021/0049452 A1* | 2/2021 | Fan | G06N 3/049 |
| 2021/0149754 A1* | 5/2021 | Settle | G06F 11/076 |
| 2022/0382856 A1* | 12/2022 | Yang | G06F 21/552 |
| 2022/0383141 A1* | 12/2022 | Bakalo | G06N 5/02 |
| 2023/0244925 A1* | 8/2023 | Yang | G06N 3/088 |
| | | | 706/12 |

(Continued)

FOREIGN PATENT DOCUMENTS

WO    WO-2021215720 A1 * 10/2021    ......... H04L 41/0609

OTHER PUBLICATIONS

Dawei Shi; Causality Countermeasures for Anomaly Detection in Cyber-Physical Systems; IEEE; Year: pp. 386-401.*

*Primary Examiner* — Monjur Rahim
(74) *Attorney, Agent, or Firm* — Nicholson De Vos Webster & Elliott LLP

(57) ABSTRACT

Techniques for anomaly and causality detection are described. An example includes receiving time series data; performing anomaly detection on the received time series data to detect at least one anomaly using an anomaly detection model; detecting a causal relationship between measures, wherein a set of measures are related when a first of the set of measures has a causal influence on a second of the set of measures, wherein a single time series is a metric and a measure is a numerical or categorical quantity a metric describes; and outputting a result of the anomaly and causality relationship detections.

20 Claims, 7 Drawing Sheets

(56) References Cited

U.S. PATENT DOCUMENTS

| | | | |
|---|---|---|---|
| 2023/0325269 A1* | 10/2023 | Gusat | G06F 11/0709 714/2 |
| 2023/0379345 A1* | 11/2023 | Anderson | H04L 63/1425 |
| 2023/0421430 A1* | 12/2023 | Thakkar | H04L 41/0654 |

* cited by examiner

ANOMALY AND CAUSALITY DETECTION

BACKGROUND

Anomaly detection is widely used in various fields, including cyber-security, scientific discovery, operational metrics monitoring, etc. The goal is to detect unlikely and rare events that are both statistically abnormal and are relevant to a user's specific application. Most anomaly detectors provide a ranked list of statistical anomalies. End-users are typically not interested in all statistical anomalies but only in those that are relevant to their specific application.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for determining causal relationships in anomaly detection. An anomaly is a data point that an anomaly detector does not expect based on its understanding of a dataset. An anomaly is not necessarily good or bad, it is just unexpected. An anomaly detector learns over time to more accurately identify anomalies based on patterns that it finds in data.

Unfortunately, the detection of an anomaly does not indicate what else may be impacted by the anomaly. Detailed herein are examples of determining how an anomaly impacts something and how to display this to a user.

Throughout this description several terms are used. Detailed below are exemplary definitions for some of those terms. A metric is a time series that has been provided to detect anomalies on. Characteristics of a metric are called dimensions. Each metric can have several dimensions (e.g., country and category). A dimension value is an expression of a dimension. For example, one dimension is country and a dimension value of the dimension country is US. A dimension value for every given dimension is called a dimension value combination. A measure is a numerical or categorical quantity a metric describes (e.g., page views and transaction volume). A dimension value combination with a measure, identifies a metric uniquely.

A timestamp of a metric is an event. For example, every day of every metric is an event. An anomaly is an unexpected event. A score provided by the anomaly detector that quantifies how anomalous an event is called a probability score.

In terms of causal relationships, X has a causal influence on Y if changing X effects the outcome of Y. If changing X does not effect the outcome of Y, X has no causal influence on Y. X and Y are causally related if X causally influences Y or Y causally influences X.

Figure 1:
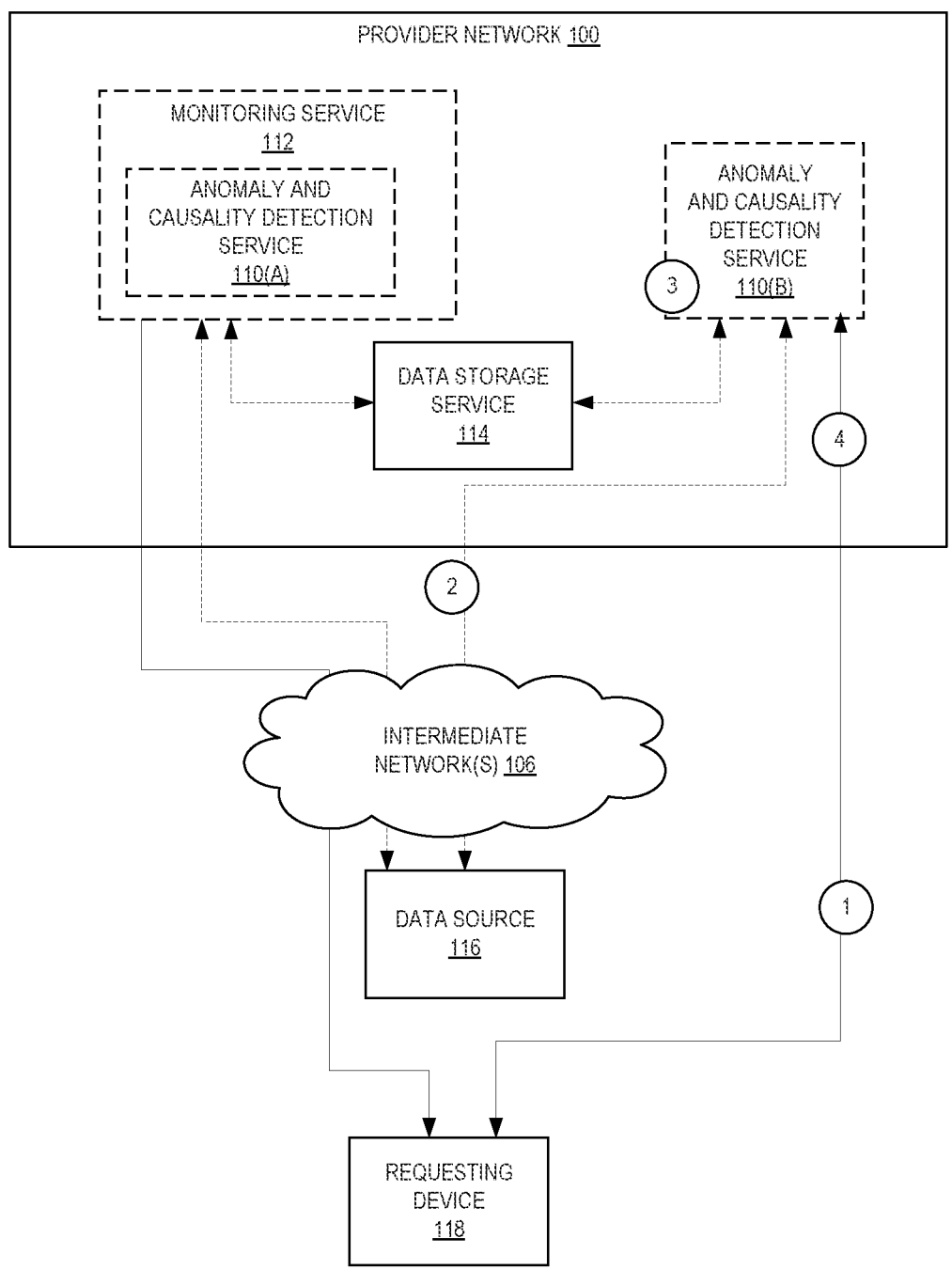
FIG. 1 illustrates embodiments of a provider network that includes an anomaly and causality detection service.

FIG. 1 illustrates embodiments of a provider network 100 that includes an anomaly and causality detection service. The anomaly and causality detection service 110(A) or 110(B) operates on, for example, log or time series data. Note that in some embodiments, as shown, the anomaly and causality detection service is a part of a monitoring service 112 (anomaly and causality detection service 110(A)) and in some embodiments, the anomaly and causality detection service is external to the monitoring service 112 (anomaly and causality detection service 110(B)). The monitoring service 112 may perform one or more of the following non-anomaly detection functions: collecting and storing logs, collecting metrics (including time series data) that may be default or custom, aggregating metrics, generating alarms, auto-scale resources, etc.

A data source (such as data storage service 114 and data source 116) provide data (e.g., logs or time series data) to be evaluated by the anomaly and causality detection service 110(A) or 110(B) for potential anomalies. The anomaly and causality detection service 110(A) or 110(B) includes, or has access to, a plurality of different machine learning models (e.g., as an ensemble or individually) or other anomaly detection mechanisms (e.g., statistical). These models/algorithms analyze metrics of systems and applications, determine normal baselines, and surface anomalies with minimal user intervention. Each anomaly scorer associates to each new data point a score based on the statistical rarity of the observation (e.g., with respect to a training set or existing data).

In some embodiments, when an anomaly and causality detection system is created, its sensitivity is set at some default value that is a function of the properties of the data, but not of labels or preferences. The default sensitivity can be orders of magnitude away from a preferred sensitivity, about which there may be no prior information.

The anomaly detection algorithms/models detailed herein are trained to flag statistical anomalies, that is, values that are unexpected based on use of one or more trained models. Detecting statistical anomalies is an unsupervised task that only requires historical data in some embodiments. Typically, users are not interested in being alerted on statistical anomalies, but on anomalies that are of concern for a particular use case and particular anomalies are a subset of statistical anomalies, and embodiments herein describe systems, processes, etc. to learn what statistical anomalies are relevant.

In some examples, to use the anomaly and causality detection service 110(A) or 110(B), a user creates an anomaly detector, which is a machine learning; model that scans each metric in our data for anomalies. For the creation (training) of the detector, measures and dimensions to be monitored are specified and a corresponding data source is provided.

In some examples, the anomaly and causality detection service 110(A) or 110(B) performs offline anomaly detection. Therefore, data of our measures is provided. For example, the data is provided (for instance in a csv file) for a time period and the anomaly and causality detection service 110(A) or 110(B) is to inform a user about anomalies of measures for the provided data. Therefore, the data is split into training and detection. For examples, the anomaly detector then learns on the first half of the period and detects anomalies of the second half of the period.

In some examples, the anomaly and causality detection service 110(A) or 110(B) is configured as an online streaming application. Here, the anomaly detector automatically imports new data from a data source based on the specified data frequency. This means that the detector can import the data about page views, revenue, profit and transaction volume from our data source for all products daily. As in the offline setting, the detector first needs to be trained to do anomaly detection. Therefore, historical metric data (i.e., past observations of measures) is to be provided. The anomaly detector uses that historical data to train. If historical data is not available in the online streaming setup, newly imported data is only used to train the model until the detector is ready for the anomaly detection. After training, the detector searches for anomalies in all newly imported data. Further, the detector is updated periodically to increase accuracy.

For both options, the anomaly detector is able to identify anomalies without any customer input that labels anomalous events.

The anomaly and causality detection service 110(A) or 110(B) also determines, for an anomaly, a causal relationship and contribution for potentially anomaly causing measures to the anomaly and what anomalies and/or measures are impacted.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

Circles with numbers inside indicate an exemplary flow of activities. At circle 1, a requesting device 118 sends a request to the provider network 100 configure the anomaly and causality detection service 110(B). Exemplary content of such a request is detailed later.

At circle 2, after the configuration of the anomaly and causality detection service 110(B), the data source 116 provides data to be evaluated. The anomaly and causality detection service 110(B) evaluates the data at circle 3 and determines there is an anomaly. The anomaly and causality detection service 110(B) sends an indication of the anomaly and causal relationship information to the requesting device 118 at circle 4.

Figure 2:
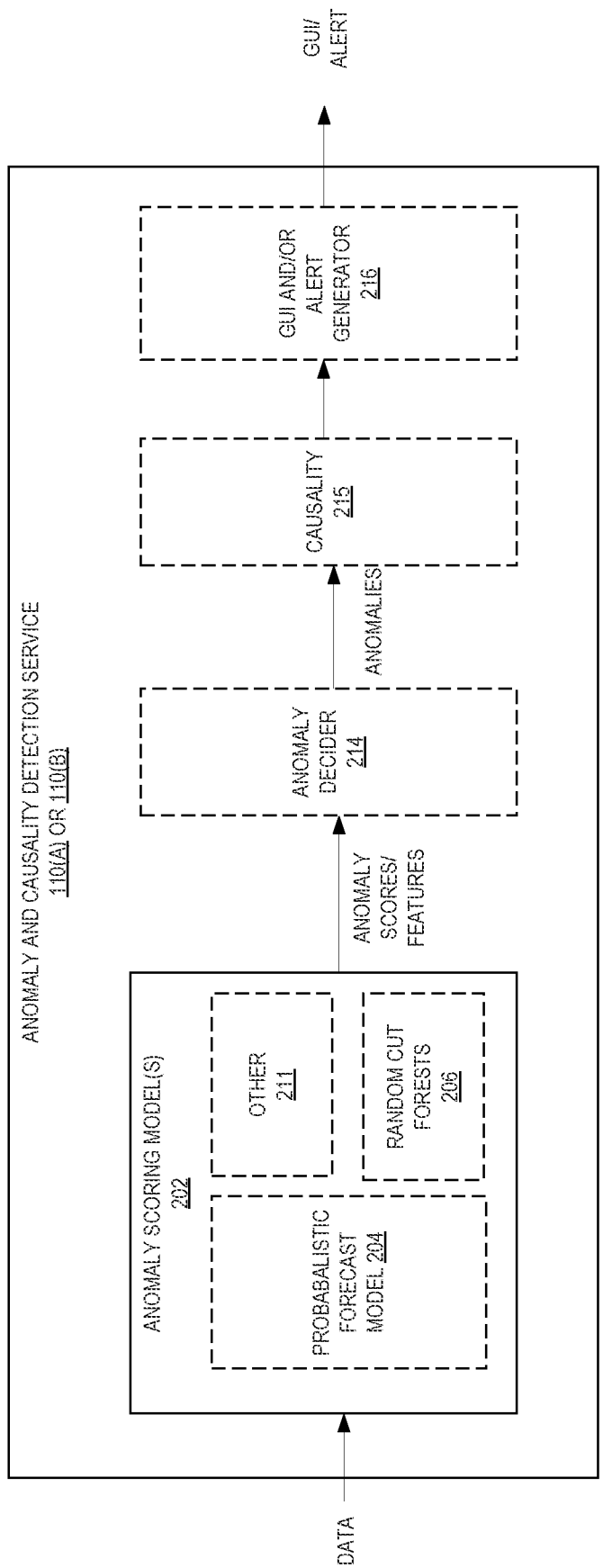
FIG. 2 illustrates embodiments of an anomaly and causality detection service.

FIG. 2 illustrates embodiments of an anomaly and causality detection service. In some embodiments, this illustrates the anomaly and causality detection service 110(A) or the anomaly and causality detection service 110(B) of FIG. 1. As shown, the anomaly and causality detection service 110(A) or 110(B) includes an anomaly and causality detection system 200 that includes one or more anomaly scoring model(s) 202. In this example, the anomaly scoring model(s) 202 includes one or more of is a probabilistic forecast model 204, a random cut forests model 206, an "other" model 211 such as IID, RNN, etc. One or more of these models 202 take in data and generate anomaly scores and/or features based on the input data in the input data.

The Random Cut Forest (RCF) model 206 represents a class of ensemble methods (similar to isolation forest) which estimates the density of data points directly by a forest of random cut trees. Each tree randomly cuts high dimensional data points into sub-spaces. The number of cuts is required to isolate a point is proportional to its estimated density. The depth of a data point in a tree is a measure of the rarity of this point, which yields an anomaly score.

An anomaly decider 214 takes scores and/or features from one or more of the anomaly scoring models 202 and determines if there is an anomaly to raise or not. In some embodiments, an anomaly is raised when a score for a datapoint is less than a threshold. In some embodiments, an anomaly is raised when a score for a datapoint is greater than a threshold. Note that the score may be some combination of multiple models such as an average, a mean, etc.

A causality component 215 quantifies to what extent an anomaly group is caused by other anomaly groups.

In some examples, a graphical user interface (GUI) and/or alert generator 216 provides a result of the anomaly and causality detection.

The anomaly and causality detection service 110(A) or the anomaly and causality detection service 110(B) also includes a feedback incorporator in some examples that receives feedback on a detected potential anomaly and uses that feedback to adjust the output of the service. Note that the models 202 themselves are not adjusted. In particular, the feedback incorporator 212 tweaks the anomaly decider 214 to modify the threshold used to classify observations to output as anomalous and/or what is considered to be anomalous.

Figure 3:
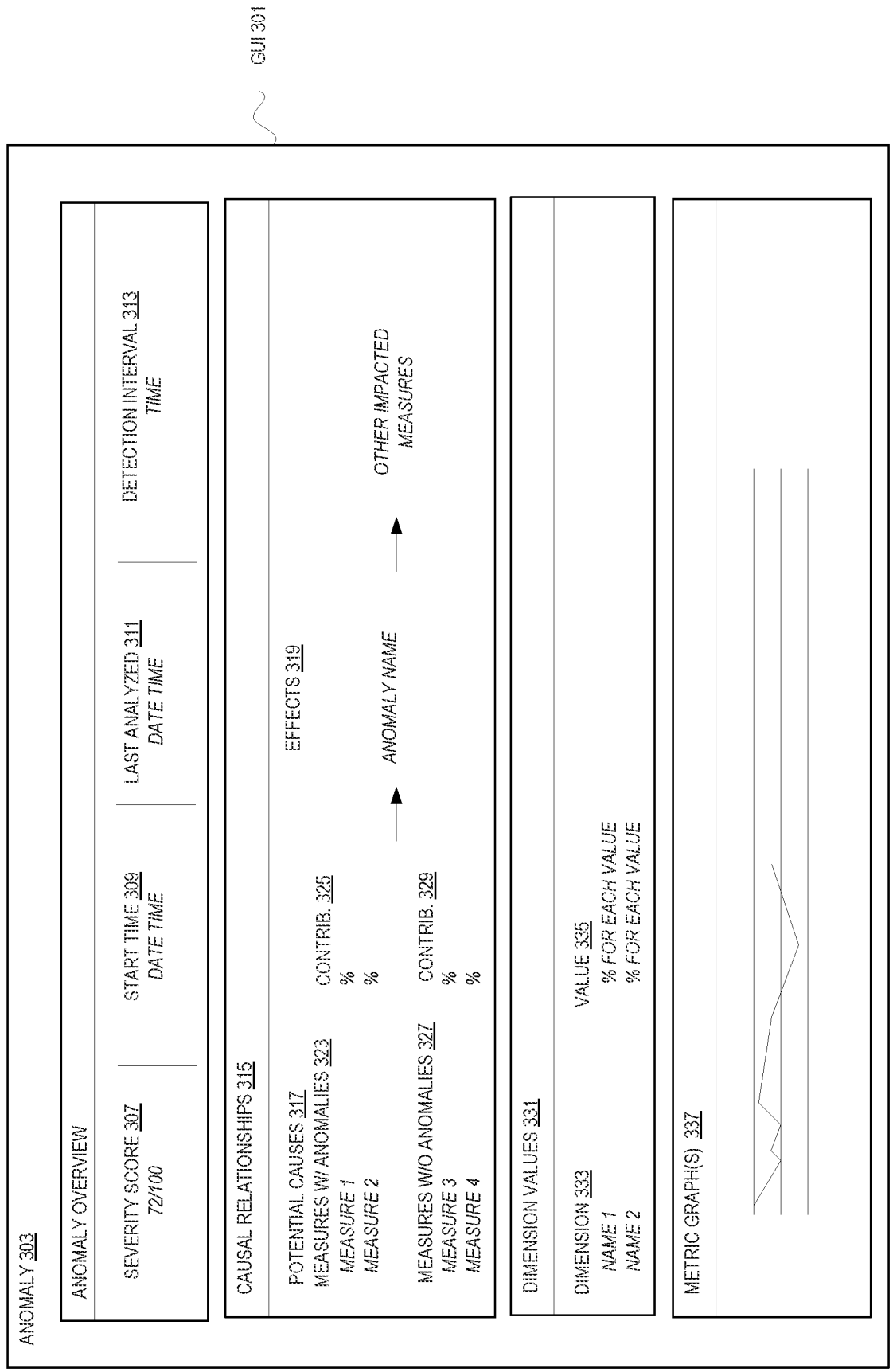
FIG. 3 illustrates examples of a graphical user interface generated by an anomaly and causality detection service.

FIG. 3 illustrates examples of a graphical user interface generated by an anomaly and causality detection service. In this illustration, the GUI 301 details information about a particular anomaly 303.

In some examples, related anomalies are automatically grouped together and a severity score is assigned to the group of anomalies that quantifies how severe (i.e., unlikely) the anomaly group is. To understand the composition of the anomalies of a group, in some examples, every group is equipped with a graphical overview that quantitatively attributes the severity of the group to the dimensions and corresponding dimension values in which the anomalies occurred. The contribution shown in the dimension values reflects how many and how severe the anomalies are.

As such, in some examples, the GUI 301 includes information about the anomaly itself such as one or more of a severity score 307 for the anomaly 303, a start time 309 for anomaly and causality detection, a last analyzed time 311 indicating when the anomaly and causality detection was last run, and/or a detection interval 313 indicating how often anomaly and causality detection is to be performed.

A causal relationships section 315 identifies the measures in datasets that are potentially causing anomalies 323 and/or measures that are not causing anomalies 327 at specific time points and also identifies other measures that may be impacted by the anomaly. An indication of an amount of influence 325, 329 is also provided in some examples. Measures without anomalies are measures that do not contain anomalies, but still contribute to the anomaly being inspected.

Measures that may be impacted by the anomaly are shown in an effects section 319. This section 319 shows the anomaly being reviewed and any measures that may be impacted by the anomaly.

In some examples, the GUI 301 includes a section for dimension values 331. The names of dimensions 333 are shown along with a contribution rate each value 335.

In some examples, a user may provide feedback to indicate whether the anomaly is relevant. When the anomaly detector finds similar anomalies later, it will consider the feedback as it determines the severity score.

In some examples, when there are anomalies in multiple metrics for the same measure, those anomalies are grouped together into a single event. In essence, redundant anomaly groups are de-duplicated. This reduces the number of alerts sent.

Figure 4:
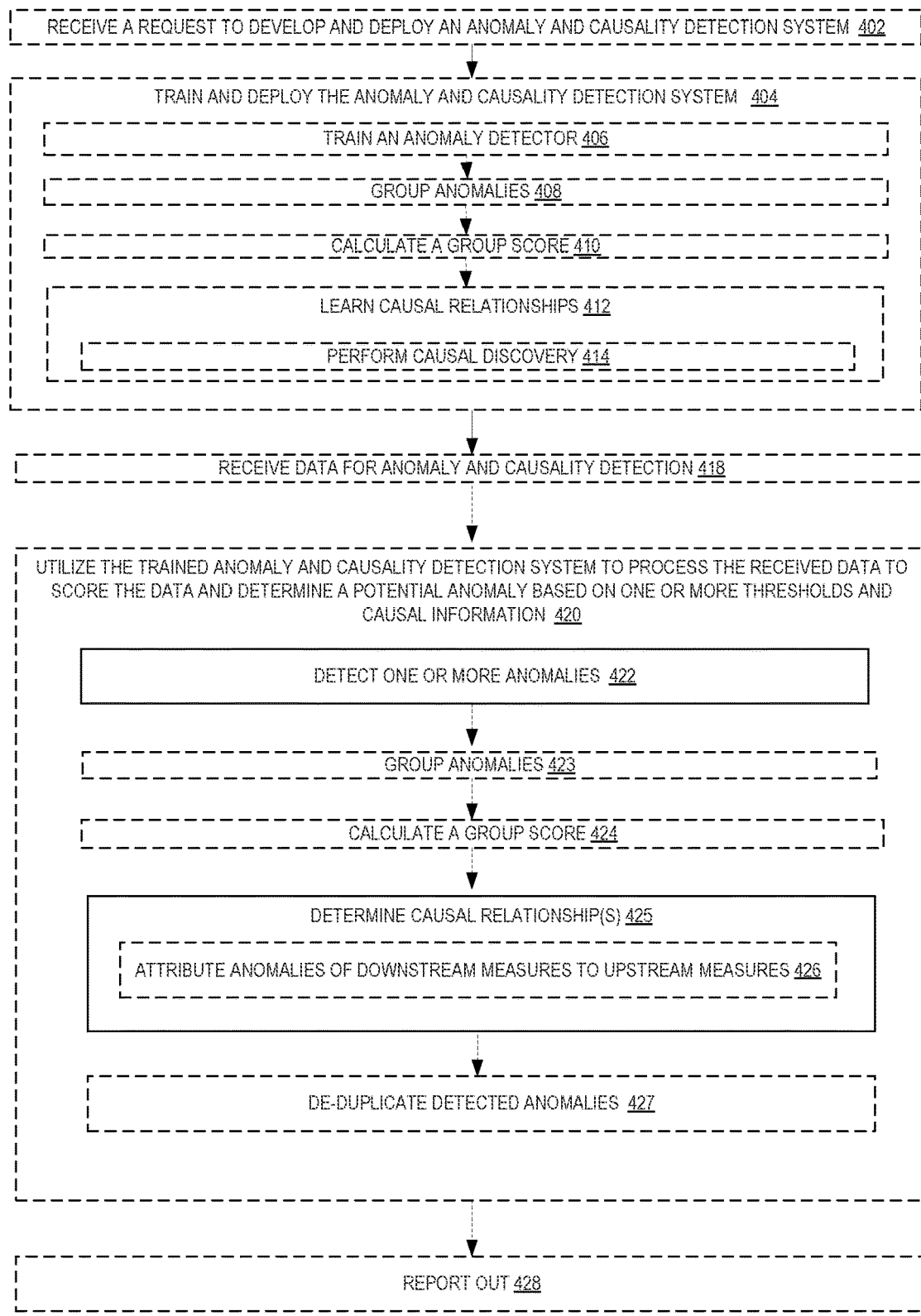
FIG. 4 is a flow diagram illustrating operations of a method for performing anomaly and causality detection according to some embodiments.

FIG. 4 is a flow diagram illustrating operations of a method for performing anomaly and causality detection according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the anomaly and causality detection service 110(A) or 110(B) of the other figures.

In some examples below, the following mathematical definitions are used.

m: Denotes a measure $N_m$: Number of metrics if measure m $i, i_1, \ldots, i_{N_m}$: Denotes a vector $(i_1, \ldots, i_n)$ where n is the number of dimensions and $i_1, \ldots, i_n$ are possible m dimension values of the dimensions 1 to n (i.e. i denotes a possible dimension value combination)

$I, I_1, I_2$: Sets of dimension value combinations j, i: Metric with dimension value combination i belonging to measure j $P_t^{m,i}$: The probability score of the dimension value combination i to the measure m $PA(m)^i$: the i-th parent measure of measure m, i.e. the i-th measure that directly causally influences measure m $p_t^{PA(m)_i,i}$: The probability score of the metric with dim. value combination i to the i-th parent measure of measure m $s_t^{m,i}$: For multiplicity adjusted p-values according to stm, i1, ..., stm, iNm:=FDRC (ptm, i1, ..., ptm, iNm), where Nm denote the number ... for the metric belonging to the dimension value combination i of measure m $s_t^{PA(m)_i,i}$: For multiplicity adjusted p-values according to stm, i1, ..., stm, iNm:=FDRC(ptm, i1, ..., ptm, iNm), where Nm denote the number ... for the metric belonging to the dim. value combination i of the i-th parent measure of measure m $n_t^{m,i}$: Unobserved noise (=innovation) of the metric belonging to dim. value combination i to the measure m $n_t^{PA(m)_i,i}$: Unobserved noise (=innovation) of the metric with dim. value combination i to the i-th parent measure of measure m In some examples, a request to develop an anomaly and causality detection system is received at 402. In particular, in some embodiments, the request is one to train and deploy an anomaly and causality detection system of an anomaly and causality detection service. The request includes one or more of: an indication of a location of a dataset to be used for training; a dataset to be used for training; an indication of at least one machine learning algorithm to train to become an anomaly and causality detection model; at least one machine learning algorithm to train to become an anomaly and causality detection model; and/or an indication of a location of a location to store results of anomaly and causality detection.

In some examples, at 404, the anomaly and causality detection system is trained and deployed using the training data of or indicated by the request. In some embodiments, the training data is historical observations of the metrics to monitor (e.g., time series data having a value and a time). As such, in some embodiments, the training data is unlabeled. In other embodiments, the training data includes at least some labeled training data. In some examples, the training comprises one or more acts.

In some examples, an anomaly detector is trained at 406 such as scoring model(s) 212. The anomaly detector is trained to provide a probability score for every time series at the current timestamp that describes how likely it is that this time series currently behaves normal. Additionally, a decision is made for every time series at the current time stamp. If the corresponding probability score is below the decision threshold, the current observation of the time series is regarded as anomalous. Note that in some examples an existing anomaly detector is used.

In some examples, the trained anomaly detector is used to generate anomalies to mimic deployed usage. In some examples, detected anomalies are grouped together based on the measure they belong to at 408. A metric is anomalous whenever the probability score is below a corresponding decision threshold. With this approach, it should be transparent to a user why anomalies got grouped together, additional information such as the cross-metric contribution can relate the anomaly groups (i.e., anomalies of different measures) to each other.

Examples of how to perform anomaly grouping are detailed herein. To avoid the multi hypothesis testing issues described above, a False Discovery Rate Control (FDRC) approach is first applied to all probability scores from measure m, i.e., not only on the anomalous time series. This gives adjusted probability scores $$s_t^{m,i_1}, \ldots, s_t^{m,i_{N_m}} := FDRC\left(p_t^{m,i_1}, \ldots, p_t^{m,i_{N_m}}\right),$$

where $N_m$ denote the number of times a series of measure m.

The group score for measure mm mat timestamp t, t, t, ptm E [0,1]p_t^∈ [0,1]ptme [0,1] is then defined by $$p_t^m := \min\left[p_t^{m,i_1}, \ldots, p_t^{m,i_{N_m}}\right]$$

This score represents the p-value of the hypothesis that there was no significant anomaly at time stamp t in measure m. Therefore, the lower p-value the higher the chance of an anomaly. This can be simply mapped to a score from 0 to 100 (where 100 is the most severe score):

group_score:=min[−log$_{10}(p_t^m)$,10]·10

Note that the map describes the information content of the event. The information content should satisfy the following properties:
1. An event with probability 100% is perfectly unsurprising and yields no information.
2. The less probable an event is, the more surprising it is and the more information it yields.

3. If two independent events are measured separately, the total amount of information is the sum of the self-information of the individual events.

−log is the unique function of probability that satisfies these 3 axioms, the higher −log $p_t^m$ is, the more surprising the event is, i.e. the higher −log $p_t^m$, the more anomalous is the event. Base 10 is a scaling factor which we use to map the information content to the interval [0, 100].

In some examples, to quantify how severe the anomalies that the group consists of are, every group is equipped with a group score at 410. In some examples, this score ranges from 0 to 100, the more time series of a measure are anomalous and the more critical an anomaly is based on the probability score from the anomaly detector, the higher the group score is. However, since anomaly detection is a statistical procedure falsely discovered anomalies may occur frequently. As a consequence, the groups would get a relatively high group score if those false discoveries are not accounted for. Consequently, to mitigate the number of groups with high group score due to false discovered anomalies, in some examples, a false discovery rate control procedure is applied on all metrics of the given measure which accounts for multi hypotheses testing. The group score is then given as the smallest, for multiplicity adjusted, probability score, mapped into the range from 0 to 100, and hence reflects the most severe anomaly within the group after adjustment. In some examples, a user can filter groups based on the group score via a threshold dial.

At 412 the causality detector 215 is trained to learn causal relationship (e.g., via a cross-metric contribution analysis). The cross-metric contribution analysis feature quantifies to what extent an anomaly or anomaly group associated with a metric is caused by other metric anomalies or anomaly groups. Groups of the same time instance (i.e., instantaneous causal effects) are attributed to each other. Since anomalies are grouped by measures, this means that the cross-metric contribution analysis quantifies to what extent anomalies of measures are caused by anomalies of the causing measures of the same time instance.

For this training causal relations between the measures are discovered (inferred) at 414. In some examples, to infer the causal relations between the measures, a Granger-based causality method is used that takes the specific data structure of into account in a data format that may be called panel data. In other examples, LiNGAM-based (e.g., VARLinGAM) causal discovery is performed to infer inferring causal relationships between measures.

Detailed below are examples of how Granger-based causality is determined. The time series data to be evaluated is presented in some examples in a so-called panel setup, i.e. given m measures (for instance purchases and sales) and correspondingly dimension value combinations (for instance the different countries the customer sells products); the panels are then given by the set {i∈I: (Xij; j=1, . . . , m)}\{\mathbf{i}in I: (X^j_\mathbf{i};

j=1, dots, m)}{i∈I: (Xij; j=1, . . . , m)} where XijX^j_\mathbf{i}Xij denotes the time series of the jjj-th measure to the dimension value combination i\mathbf{i}i. To obtain the causal structure between the measures, the following procedure is applied:

Step 1: Fix an arbitrary dimension value combination i\mathbf{i}i. To this i\mathbf{i}I, calculate a p-value via linear Granger causality for each possible causal link, i.e. for each possible influence between measures (using an FFF-statistic) where 1 time lag is used. If the time series have a strong memory effect, Granger is able to detect instantaneous effect, to increase the statistical signal for Granger causality of the instantaneous effect.

By $P_{kj}^i$ the p-value for the causal influence is denoted from the k-th to the j-th measure, where this relation for k ⊟ j is only calculated.

Step 2: Repeat this for every i. For example, for computational reasons, repeat this only for 500 dimension value combinations which are sampled uniformly (without replacement).

Step 3: Derive a single p-value per potential link between measures by aggregating the constructed p-values to obtain a single p-value for each possible causal relation. For that, the following quantity is defined:

$$Q_{kj}(\gamma) := \min(1, emp.\gamma\text{-quantile}\{p_{kj}^i / \gamma, i \in I\}), \gamma \in (0,1)$$

It then holds that under the assumption of linear relations between the measures and further restrictions which are common in Granger causality, that the type I error of $Q_{kj}(\gamma)$ is asymptotically bounded by the chosen significance level, i.e. $Q_{kj}(\gamma)$ is a correct p-value for the null hypotheses that measure k does not causally influence measure j.

Step 4: To account for the hypotheses testing, apply Bonferroni correction on {$Q_{kj}(\gamma)$, k⊟j} to counteract the multiple-comparisons problem which arises.

In some examples γ=0.5 is used.

Once the one or more models for anomaly and causality detection are deployed, time series data is received for anomaly and causality detection at 418. In some examples, the time series data is a single time series. In some examples, the time series data comprise multiple time series.

The trained anomaly and causality detection system is used to process the received data to score the data and determine if there is a potential anomaly based on one or more thresholds and also determine causal information at 408. For example, one or more of the models 202 are used to generate a score at 422 and the anomaly decider 214 determines if that score indicates that there is an anomaly based one or more thresholds.

In some examples, anomalies are grouped at 423. Examples of how to group have been detailed above. Note that grouping typically occurs when multiple time series are received. In some examples, a group score is calculated at 424. Examples of how to calculate group scores have been detailed above.

One or more causal relationships are determined based on previous causal discovery (e.g., using a trained model) at 425.

In some examples, the causal relationship determination includes an attribution (i.e., contribution scoring method) at 426. Attribution may be for a single time series or by group of time series.

Detailed below are examples of how contributions are calculated. In some examples, cross-metric contributions are analyzed on two levels:

Individual time series level: A contribution chart for every single dimension value combination.

Measure level: The aggregation of the individual time series level contributions to give the customer condensed information about the causes of the anomalies in the measure under consideration.

For an individual time series level, a causal model that indicates whether there is an anomaly in a target metric based on the given scores of its parents is analyzed. Here, only time series across measures with the same multi-index i are considered, i.e. the model represents $$y_t^{m,i} = g(s_t^{PA(m)0,i}, \ldots, s_t^{PA(m)k,i}, n_t^{m,i}),$$

where $y_t^{m,i} \in \{0,1\}$ indicates whether there is an anomaly in metric m at timestamp t for multi-index i, $n_t^{m,i}$ represents an unobserved noise/unexplained influence and $PA(m)_i$ the i-th parent measure. Using the learned model g, an anomaly $y_t^{m,i}$ can be attributed to the inputs $s_t^{PA(m)_o,i}, \ldots, s_t^{PA(m)_k,i}$, where it is possible to contribute each input value to the outcome of the model and, due to the noise term, identify the part that is not explainable by the observed inputs.

In some examples, a logistic regression model is used, i.e.

$$p(y_t^{m,i} = 1 | s_t^{PA(m),i}) = \frac{1}{1 + e^{-(a^T s_t^{PA(m),i} + C)}}$$

with $s_t^{PA(m),i} = s_t^{PA(m)_o,i}, \ldots, s_t^{PA(m)_k,i}$

Although the noise cannot be modeled directly, the total contribution of $s_t^{PA(m),i}$ to the outlier score $f_{y_t}^{m,i} = -\log(p(y_t^{m,i}=1$ can be defined by $$C(s_t^{PA(m),i}) := \log \frac{p(y_t^{m,i} = 1 | s_t^{PA(m),i})}{f_{y_t}^{m,i}} < f_{y_t}^{m,i}$$

The fraction of the outlier score explained by the input is then given by:

$$r_{s_t}^{PA(m),i} := \frac{C(s_t^{PA(m),i})}{f_{y_t}^{m,i}}$$

The coefficients for the contribution of each feature can be used $$c(s_t^{PA(m)_j,i}); = \frac{a_j s_t^{PA(m)_j,i}}{\sum_k a_k s_t^{PA(m)_k,i}} r s_t^{PA(m),i}$$

Since a negative contribution in general could also be generated (e.g., a feature can reduce the chance of an anomaly) but cannot display this currently, the following modification is sued:

$$a_k^+ := \max[a_k, 0]$$

$$r_{s_t^{PA(m),i}}^+ := \max[r_{s_t^{PA(m),i}}, 0]$$

These would replace $a_k$ and $r_{s_t}^{PA(m),i}$ in c(stPA(m)j, i):=ΣkakstPA(m)k, iajstPA(m)j, irstPA(m), i, respectively.

For a cross contribution on the group level, we utilize the contributions on time series level by taking the averages:

$$C(S_t^{PA(m),i}) = \int p(x) \log \frac{p(y = 1|x)}{p(y = 1)} dx$$

where $S_t^{PA(m),i}$ is the random variable corresponding to $s_t^{PA(m),i}$ $$r_{s_t}^{PA(m),i} := \frac{S_t^{PA(m),i}}{f_{y_t}^{m,i}}$$

Accordingly, we take the average over the outputs of individual time series $$\emptyset = \int a^T x p(x) dx$$

and obtain, similar as above, a contribution of each metric by:

$$c(j) := \frac{\emptyset_i}{\sum_i \emptyset_i} r_{s_t}^{PA(m),i}$$

This can also lead to negative contributions which, from a purely scientific point are reasonable because events can negatively affect the behavior of other events. However, to simplify the contribution analysis, the contribution is truncated at 0 as in the time series level contribution to get positive contributions to the anomaly group.

Detected anomalies and causal relationship(s) are reported out (e.g., via a GUI or API) at 428. An exemplary GUI has already been illustrated. In some examples, an API response may look as follows where "RelationshipType" indicates weather a measure is potential cause (CAUSE_OF_INPUT_ANOMALY_GROUP) or is impacted (EFFECT_OF_INPUT_ANOMALY_GROUP), "CauseContributionAmount" provides an amount a metric contributes to the anomaly, "DimensionValue" provides a dimension name, and "DimensionValueAmount" provides a numerical value for a dimension name.

HTTP/1.1 200
Content-type: application/json

```
{
    "InterMetricImpactList": [
        "AnomalyGroupId": "string",
        "ContributionPercentage": number,
        "MetricName": "string",
        "RelationshipType": "string"
        "CauseContributionAmount": "number"
        "Dimension Value": "string"
        "Dimension ValueAmount": "number"
    }
    ],
    "NextToken": "string"
}
```

In some examples, detected anomalies are de-duplicated at 424. Detailed below are examples of how de-duplication is performed. Let Group 1 and Group 2 be the two groups under consideration for de-duplication. Thereby, it is assumed that Group 1 and Group 2 consists of time series of the same measure.

Further, ;et $I_1$ and $I_2$ denote the corresponding set of all dimension value combinations of time series in Group 1 and Group 2, respectively. Then the decision whether Group 1 and Group 2 are similar is based on the following simple rule:

$$\frac{|I_1 \cup I_2| - |I_1 \cap I_2|}{|I_1 \cup I_2|} \leq \beta$$

If the left hand side is smaller than the right hand side, then we merge the groups 1 and 2. This approach is also called the Jaccard distance—it compares the non-overlapping time series between anomaly group 1 and 2 to the overall set of anomalies of the anomaly groups 1 and 2. Hence, a check is performed of how many times series are in both groups, if this number is high relative to the total number of time series in the groups, the anomalies are merged.

Figure 5:
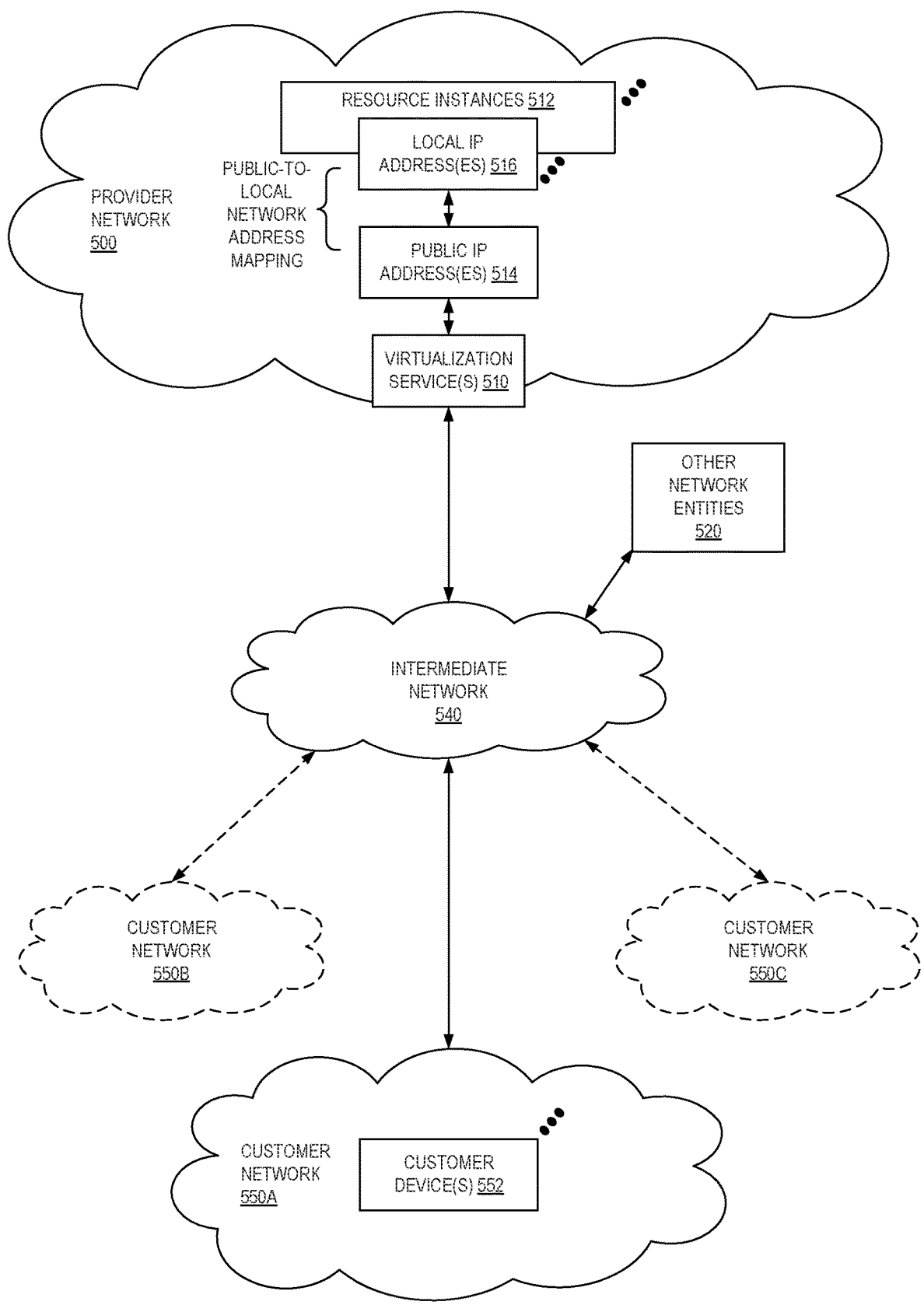
FIG. 5 illustrates an example provider network environment according to some embodiments.

FIG. 5 illustrates an example provider network (or "service provider system") environment according to some embodiments. A provider network 500 can provide resource virtualization to customers via one or more virtualization services 510 that allow customers to purchase, rent, or otherwise obtain instances 512 of virtualized resources, including but not limited to computation and storage resources, implemented on devices within the provider network or networks in one or more data centers. Local Internet Protocol (IP) addresses 516 can be associated with the resource instances 512; the local IP addresses are the internal network addresses of the resource instances 512 on the provider network 500. In some embodiments, the provider network 500 can also provide public IP addresses 514 and/or public IP address ranges (e.g., Internet Protocol version 4 (IPv4) or Internet Protocol version 6 (IPv6) addresses) that customers can obtain from the provider 500.

Conventionally, the provider network 500, via the virtualization services 510, can allow a customer of the service provider (e.g., a customer that operates one or more customer networks 550A-550C (or "client networks") including one or more customer device(s) 552) to dynamically associate at least some public IP addresses 514 assigned or allocated to the customer with particular resource instances 512 assigned to the customer. The provider network 500 can also allow the customer to remap a public IP address 514, previously mapped to one virtualized computing resource instance 512 allocated to the customer, to another virtualized computing resource instance 512 that is also allocated to the customer. Using the virtualized computing resource instances 512 and public IP addresses 514 provided by the service provider, a customer of the service provider such as the operator of the customer network(s) 550A-550C can, for example, implement customer-specific applications and present the customer's applications on an intermediate network 540, such as the Internet. Other network entities 520 on the intermediate network 540 can then generate traffic to a destination public IP address 514 published by the customer network(s) 550A-550C; the traffic is routed to the service provider data center, and at the data center is routed, via a network substrate, to the local IP address 516 of the virtualized computing resource instance 512 currently mapped to the destination public IP address 514. Similarly, response traffic from the virtualized computing resource instance 512 can be routed via the network substrate back onto the intermediate network 540 to the source entity 520.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 500; a customer can then assign their allocated public IP addresses to particular resource instances allocated to the customer. These public IP addresses can be referred to as customer public IP addresses, or simply customer IP addresses. Instead of being assigned by the provider network 500 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 6:
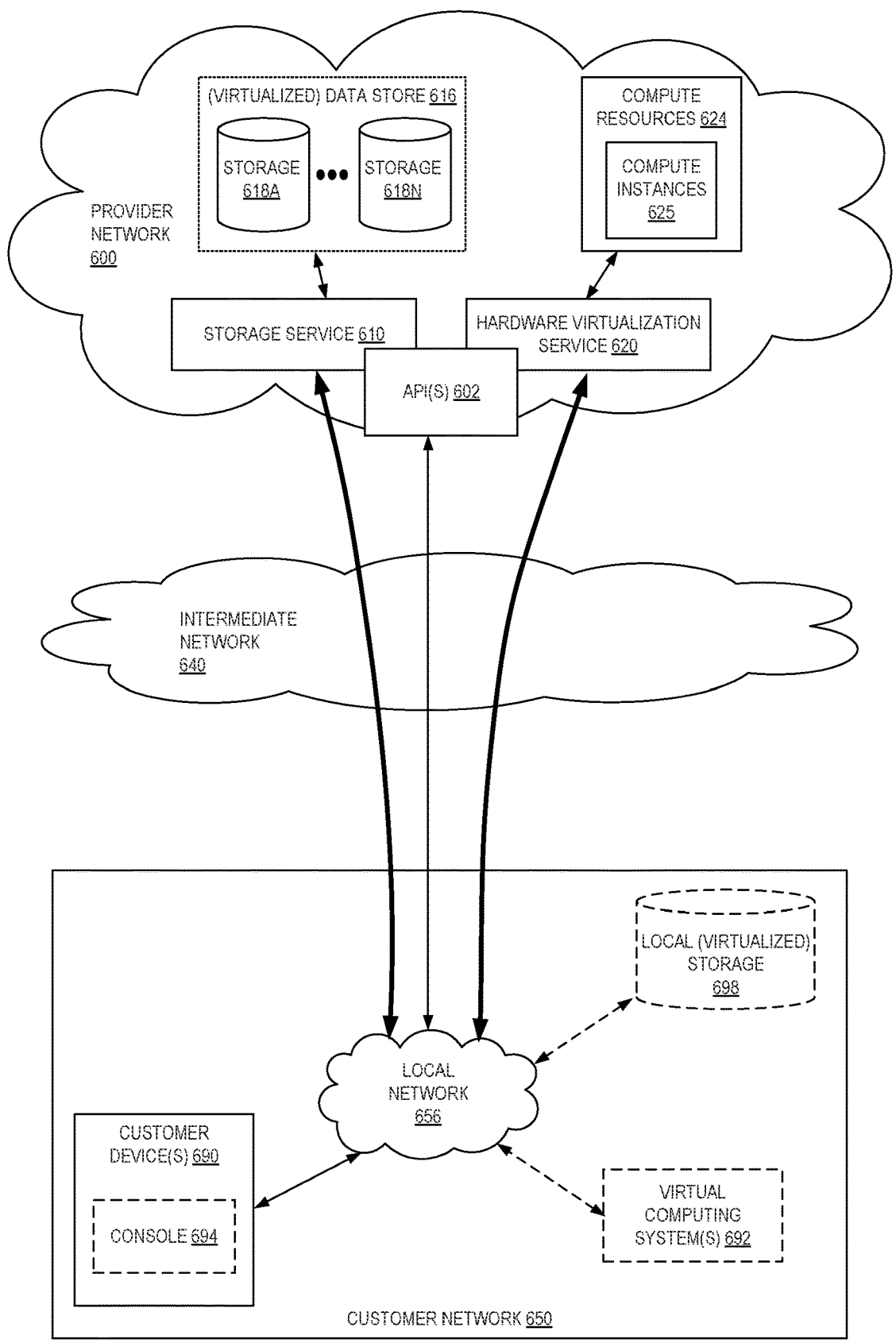
FIG. 6 is a block diagram of an example provider network that provides a storage service and a hardware virtualization service to customers according to some embodiments.

FIG. 6 is a block diagram of an example provider network environment that provides a storage service and a hardware virtualization service to customers, according to some embodiments. A hardware virtualization service 620 provides multiple compute resources 624 (e.g., compute instances 625, such as VMs) to customers. The compute resources 624 can, for example, be provided as a service to customers of a provider network 600 (e.g., to a customer that implements a customer network 650). Each computation resource 624 can be provided with one or more local IP addresses. The provider network 600 can be configured to route packets from the local IP addresses of the compute resources 624 to public Internet destinations, and from public Internet sources to the local IP addresses of the compute resources 624.

The provider network 600 can provide the customer network 650, for example coupled to an intermediate network 640 via a local network 656, the ability to implement virtual computing systems 692 via the hardware virtualization service 620 coupled to the intermediate network 640 and to the provider network 600. In some embodiments, the hardware virtualization service 620 can provide one or more APIs 602, for example a web services interface, via which the customer network 650 can access functionality provided by the hardware virtualization service 620, for example via a console 694 (e.g., a web-based application, standalone application, mobile application, etc.) of a customer device 690. In some embodiments, at the provider network 600, each virtual computing system 692 at the customer network 650 can correspond to a computation resource 624 that is leased, rented, or otherwise provided to the customer network 650.

From an instance of the virtual computing system(s) 692 and/or another customer device 690 (e.g., via console 694), the customer can access the functionality of a storage service 610, for example via the one or more APIs 602, to access data from and store data to storage resources 618A-618N of a virtual data store 616 (e.g., a folder or "bucket," a virtualized volume, a database, etc.) provided by the provider network 600. In some embodiments, a virtualized data store gateway (not shown) can be provided at the customer network 650 that can locally cache at least some data, for example frequently accessed or critical data, and that can communicate with the storage service 610 via one or more communications channels to upload new or modified data from a local cache so that the primary store of data (the virtualized data store 616) is maintained. In some embodiments, a user, via the virtual computing system 692 and/or another customer device 690, can mount and access virtual data store 616 volumes via the storage service 610 acting as a storage virtualization service, and these volumes can appear to the user as local (virtualized) storage 698.

While not shown in FIG. 6, the virtualization service(s) can also be accessed from resource instances within the provider network 600 via the API(s) 602. For example, a customer, appliance service provider, or other entity can access a virtualization service from within a respective virtual network on the provider network 600 via the API(s) 602 to request allocation of one or more resource instances within the virtual network or within another virtual network.

Illustrative Systems

Figure 7:
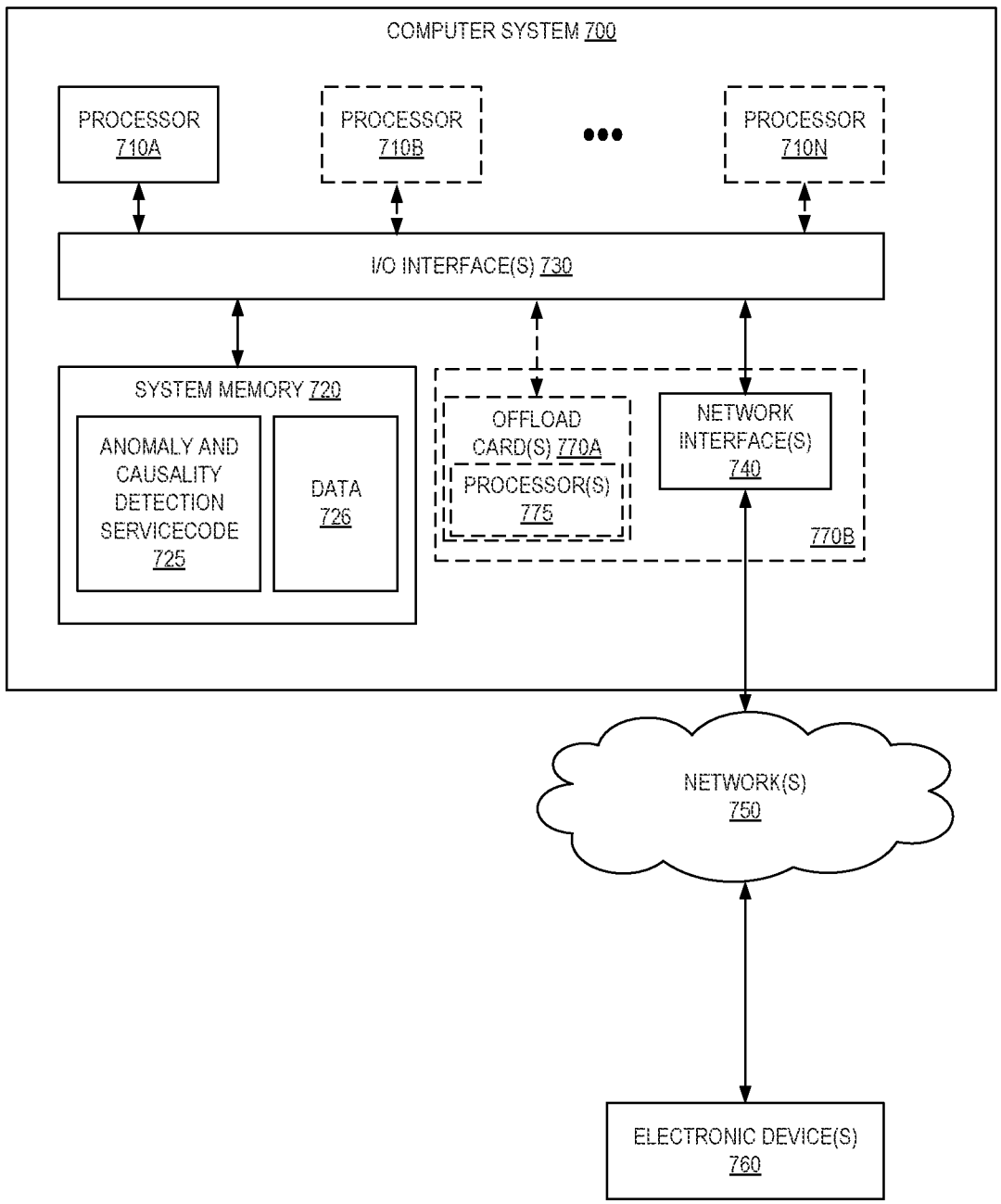
FIG. 7 is a block diagram illustrating an example computer system that can be used in some embodiments.

In some embodiments, a system that implements a portion or all of the techniques described herein can include a general-purpose computer system, such as the computer system 700 illustrated in FIG. 7, that includes, or is configured to access, one or more computer-accessible media. In the illustrated embodiment, the computer system 700 includes one or more processors 710 coupled to a system memory 720 via an input/output (I/O) interface 730. The computer system 700 further includes a network interface 740 coupled to the I/O interface 730. While FIG. 7 shows the computer system 700 as a single computing device, in various embodiments the computer system 700 can include one computing device or any number of computing devices configured to work together as a single computer system 700.

In various embodiments, the computer system 700 can be a uniprocessor system including one processor 710, or a multiprocessor system including several processors 710 (e.g., two, four, eight, or another suitable number). The processor(s) 710 can be any suitable processor(s) capable of executing instructions. For example, in various embodiments, the processor(s) 710 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 710 can commonly, but not necessarily, implement the same ISA.

The system memory 720 can store instructions and data accessible by the processor(s) 710. In various embodiments, the system memory 720 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 720 as anomaly and causality detection service code 725 (e.g., executable to implement, in whole or in part, the anomaly and causality detection service 110) and data 726.

In some embodiments, the I/O interface 730 can be configured to coordinate I/O traffic between the processor 710, the system memory 720, and any peripheral devices in the device, including the network interface 740 and/or other peripheral interfaces (not shown). In some embodiments, the I/O interface 730 can perform any necessary protocol, timing, or other data transformations to convert data signals from one component (e.g., the system memory 720) into a format suitable for use by another component (e.g., the processor 710). In some embodiments, the I/O interface 730 can include support for devices attached through various types of peripheral buses, such as a variant of the Peripheral Component Interconnect (PCI) bus standard or the Universal Serial Bus (USB) standard, for example. In some embodiments, the function of the I/O interface 730 can be split into two or more separate components, such as a north bridge and a south bridge, for example. Also, in some embodiments, some or all of the functionality of the I/O interface 730, such as an interface to the system memory 720, can be incorporated directly into the processor 710.

The network interface 740 can be configured to allow data to be exchanged between the computer system 700 and other devices 760 attached to a network or networks 750, such as other computer systems or devices as illustrated in FIG. 1, for example. In various embodiments, the network interface 740 can support communication via any suitable wired or wireless general data networks, such as types of Ethernet network, for example. Additionally, the network interface 740 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 700 includes one or more offload cards 770A or 770B (including one or more processors 775, and possibly including the one or more network interfaces 740) that are connected using the I/O interface 730 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 700 can act as a host electronic device (e.g., operating as part of a hardware virtualization service) that hosts compute resources such as compute instances, and the one or more offload cards 770A or 770B execute a virtualization manager that can manage compute instances that execute on the host electronic device. As an example, in some embodiments the offload card(s) 770A or 770B can perform compute instance management operations, such as pausing and/or un-pausing compute instances, launching and/or terminating compute instances, performing memory transfer/copying operations, etc. These management operations can, in some embodiments, be performed by the offload card(s) 770A or 770B in coordination with a hypervisor (e.g., upon a request from a hypervisor) that is executed by the other processors 710A-710N of the computer system 700. However, in some embodiments the virtualization manager implemented by the offload card(s) 770A or 770B can accommodate requests from other entities (e.g., from compute instances themselves), and cannot coordinate with (or service) any separate hypervisor.

In some embodiments, the system memory 720 can be one embodiment of a computer-accessible medium configured to store program instructions and data as described above.

However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 700 via the I/O interface 730. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 700 as the system memory 720 or another type of memory. Further, a computer-accessible medium can include transmission media or signals such as electrical, electromagnetic, or digital signals, conveyed via a communication medium such as a network and/or a wireless link, such as can be implemented via the network interface 740.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C#or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional aspects that add additional features to some embodiments. However, such notation should not be taken to mean that these are the only options or optional operations, and/or that blocks with solid borders are not optional in certain embodiments.

Reference numerals with suffix letters can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   receiving time-series data including a first time series and a second time series;
   performing anomaly detection on the time-series data to detect anomalies using an anomaly detection model;
   detecting a causal relationship between measures of the time-series data, wherein a set of measures are related when a first measure of the set of measures has a causal influence on a second measure of the set of measures, wherein a measure is a numerical or categorical quantity that describes the time-series data, and wherein detecting a causal relationship between measures of the time-series data comprises:
      grouping the anomalies by measure to generate anomaly groups, wherein anomalies in the first time series that relate to the first measure are grouped together with anomalies in the second time series that relate to the first measure and anomalies in the first time series that relate to the second measure are grouped together with anomalies in the second time series that relate to the second measure;
      scoring the anomaly groups;
      inferring causal relationships between measures of the anomaly groups to generate a causal data structure; and
      attributing anomalies of downstream measures to upstream measures using the causal data structure; and
   outputting a result of the anomaly detection and the causal relationship between measures of the time-series data in a graphical user interface.

2. The computer-implemented method of claim 1, wherein inferring causal relationships between measures of the anomaly groups to generate a causal data structure comprises performing a Granger-based causality analysis.

3. The computer-implemented method of claim 1, wherein the graphical user interface further includes information about an anomaly and information about characteristics of measures.

4. A computer-implemented method comprising:
   receiving time-series data including a first time series and a second time series;
   performing anomaly detection on the time-series data to detect anomalies using an anomaly detection model;

detecting a causal relationship between a first measure of the time-series data and a second measure of the time-series data, wherein the detecting comprises:
  grouping the anomalies by measure to generate anomaly groups, wherein anomalies in the first time series that relate to the first measure are grouped together with anomalies in the second time series that relate to the first measure and anomalies in the first time series that relate to the second measure are grouped together with anomalies in the second time series that relate to the second measure;
  scoring the anomaly groups;
  inferring causal relationships between measures of the anomaly groups to generate a causal data structure; and
  attributing anomalies that relate to the first measure to anomalies that relate to the second measure using the causal data structure; and
outputting a result of the detections detecting a causal relationship between the first measure of the time-series data and the second measure of the time-series data.

5. The computer-implemented method of claim 4, wherein inferring causal relationships between measures of the anomaly groups to generate a causal data structure comprises performing a Granger-based causality analysis.

6. The computer-implemented method of claim 4, wherein scoring the anomaly groups comprises applying a false discovery rate control procedure on all metrics of the first measure to generate a first group score.

7. The computer-implemented method of claim 6, further comprising performing deduplication on the anomaly groups after inferring causal relationships between measures of the anomaly groups.

8. The computer-implemented method of claim 4, wherein the anomaly detector is one of a probabilistic forecast model or a random cut forest model.

9. The computer-implemented method of claim 4, wherein outputting a result of the detecting a causal relationship between the first measure of the time-series data and the second measure of the time-series data comprises generating a graphical user interface that includes information about an anomaly, information about causal relationships of measures that are potential causes of the anomaly, and information about characteristics of measures.

10. The computer-implemented method of claim 9, wherein the information about characteristics of measures comprises at least one dimension that is a characteristic of a measure, wherein each metric has a plurality of dimensions.

11. The computer-implemented method of claim 4, wherein outputting a result of the detecting a causal relationship between the first measure of the time-series data and the second measure of the time-series data comprises sending an application programming interface response.

12. The computer-implemented method of claim 4, further comprising:
  receiving a request to develop and deploy an anomaly and causality detection system; and
  developing the anomaly and causality detection system by at least learning how to perform causal relationships discovery.

13. The computer-implemented method of claim 4, further comprising deploying the anomaly and causality detection system.

14. A system comprising:
one or more electronic devices to implement an anomaly and causality detection service in a multi-tenant provider network, the anomaly and causality detection service including instructions that upon execution by one or more processors cause the anomaly and causality detection service to:
  receive time-series data including a first time series and a second time series;
  perform anomaly detection on the time-series data to detect anomalies using an anomaly detection model;
  detect a causal relationship between a first measure of the time-series data and a second measure of the time-series data, wherein the detecting comprises:
    grouping the anomalies by measure to generate anomaly groups, wherein anomalies in the first time series that relate to the first measure are grouped together with anomalies in the second time series that relate to the first measure and anomalies in the first time series that relate to the second measure are grouped together with anomalies in the second time series that relate to the second measure;
    scoring the anomaly groups;
    inferring causal relationships between measures of the anomaly groups to generate a causal data structure; and
    attributing anomalies that relate to the first measure to anomalies that relate to the second measure using the causal data structure; and
  output a result of the detecting a causal relationship between the first measure of the time-series data and the second measure of the time-series data.

15. The system of claim 14, further comprising a monitoring service to provide the time-series data.

16. The system of claim 14, wherein to output a result of the detection detecting a causal relationship between the first measure of the time-series data and the second measure of the time-series data comprises generating a graphical user interface that includes information about an anomaly, information about causal relationships of measures that are potential causes of the anomaly, and information about characteristics of measures.

17. The system of claim 14, wherein the information about characteristics of measures comprises at least one dimension that is a characteristic of a measure, wherein each metric has a plurality of dimensions.

18. The system of claim 14, wherein the anomaly detector is one of a probabilistic forecast model or a random cut forest model.

19. The system of claim 14, wherein inferring causal relationships between measures of the anomaly groups to generate a causal data structure comprises performing a Granger-based causality analysis.

20. The system of claim 14, wherein inferring causal relationships between measures of the anomaly groups to generate a causal data structure comprises performing a Granger-based causality analysis.

* * * * *